(12) United States Patent
Ablondi et al.

(10) Patent No.: US 6,999,923 B1
(45) Date of Patent: Feb. 14, 2006

(54) SYSTEM AND METHOD FOR CONTROL OF LIGHTS, SIGNALS, ALARMS USING SOUND DETECTION

(75) Inventors: William J. Ablondi, Marlborough, MA (US); Paul S. Cohen, Yorktown Heights, NY (US); Edward J. Gleason, Yorktown Heights, NY (US); Paul S. Roossin, Hastings-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 09/602,452

(22) Filed: Jun. 23, 2000

(51) Int. Cl.
*G10L 15/00* (2006.01)

(52) U.S. Cl. ........................ 704/231; 704/273
(58) Field of Classification Search ............... 704/231, 704/243, 244, 270, 270.1, 272, 274, 276, 704/273; 702/189, 190
See application file for complete search history.

(56) References Cited

U.S. PATENT DOCUMENTS

| | | | | |
|---|---|---|---|---|
| 3,553,372 A | * | 1/1971 | Wright et al. ............... | 704/211 |
| 4,107,460 A | * | 8/1978 | Grunza et al. .............. | 704/253 |
| 4,208,735 A | * | 6/1980 | Suzuki et al. ............... | 367/136 |
| 4,509,151 A | * | 4/1985 | Anderson .................... | 367/118 |
| 4,558,439 A | * | 12/1985 | Gudesen ..................... | 367/127 |
| 4,833,714 A | * | 5/1989 | Shimotani et al. .......... | 704/253 |
| 4,956,866 A | * | 9/1990 | Bernstein et al. ........... | 704/274 |
| 5,165,417 A | * | 11/1992 | Murphy, Jr. ................. | 600/529 |
| 5,444,443 A | * | 8/1995 | Umeda et al. .............. | 340/933 |
| 5,521,840 A | * | 5/1996 | Bednar ....................... | 702/183 |
| 5,794,194 A | * | 8/1998 | Takebayashi et al. ....... | 704/251 |
| 5,839,109 A | * | 11/1998 | Iwamida ..................... | 704/271 |
| 5,884,264 A | * | 3/1999 | Ortiz ........................... | 704/270 |
| 6,377,923 B1 | * | 4/2002 | Hershkovits et al. ....... | 704/253 |
| 6,416,308 B1 | * | 7/2002 | Pena ........................... | 425/169 |
| 6,487,572 B2 | * | 11/2002 | Kamiya et al. ............. | 708/313 |
| 6,535,131 B1 | * | 3/2003 | Bar-Shalom et al. ..... | 340/573.1 |
| 6,539,358 B1 | * | 3/2003 | Coon et al. ................. | 704/275 |

OTHER PUBLICATIONS

Lalit R. Bahl, Member, IEEE; Frederick Jelinek, Fellow, IEEE; and Robert L. Mercer. "A Maximum Likelihood Approach to Continuous Speech Recognition." *IEEE Transactions on Pattern Analysis and Machine Intelligence*. vol. PAMI-5, No. 2, Mar. 1983.

Silvia Pfeiffer, Stephan Fischer and Wolfgang Effelsberg. "Automatic Audio Content Analysis." ACM Multimedia 96, Boston, MA, 1996.

* cited by examiner

*Primary Examiner*—Martin Lerner
(74) *Attorney, Agent, or Firm*—Richard Lau; Anne Vachon Dougherty

(57) ABSTRACT

A system and method for detecting the presence of a particular source of audible content using an automatic speech recognizer component which is trained to recognize specific non-speech sounds. Training of the automatic speech recognizer component is accomplished by providing an appropriate model to be recognized and by tuning the automatic speech recognizer to the sounds created by the desired stimulus. The automatic speech recognizer can additionally be provided with processing means for distinguishing the desired stimulus from an irrelevant or unwanted stimulus which may have acoustic signatures with a high degree of similarity to that of the desired stimulus. The invention can be implemented in a portable detector to allow detection of a specific acoustic source at any location.

18 Claims, 2 Drawing Sheets

SYSTEM AND METHOD FOR CONTROL OF LIGHTS, SIGNALS, ALARMS USING SOUND DETECTION

FIELD OF THE INVENTION

The invention relates generally to acoustics and more specifically to the use of trained speech recognition mean for remote detection and characterization of sounds.

BACKGROUND OF THE INVENTION

For automatic detection systems that trigger responses such as sounding audible alarms, switching traffic signals, operating lights, or generating other detectable responses, prior art systems have generally relied upon the presence of motion detection, or mechanical activation. For example, mechanical switches coupled to train rails have been used to activate railroad crossing gates and signals. Similarly, counter strips are used to count the number of vehicles approaching a red traffic light and to change the light to green when a threshold number have crossed the counter strip. Mechanical systems suffer from the drawback that the sensors cannot distinguish among the various physical entities which come into contact with them. Therefore, when attempting to detect the presence of a particular physical entity (e.g., an approaching train rather than an approaching handcar), a mechanical sensor would not be able to determine if that particular entity was present.

Motion sensors (e.g., infrared detectors) generally react when triggered by visual or heat-sensory stimuli. Like the mechanical detectors, however, motion sensors are not able to distinguish between a target stimulus and other unwanted stimuli. Motion sensors which activate lighting for property perimeters, for example, will therefore often be triggered by moths, small animals, blowing leaves, etc.

Detection systems have additionally been proposed which react to audible stimuli. The sound detection systems generally respond to sound at or above a threshold decibel level. However, the latter type of system is also highly likely to react to false stimuli in the same decibel range as that of the expected stimulus.

It is desirable, therefore, to have detection equipment which can both detect and characterize sounds. In addition, it may also be desirable to have the detection equipment be portable in order to provide security wherever needed.

It is, therefore, an objective of the present invention to provide an improved system and method for detection of audible stimuli.

It is another objective of the present invention to provide a sound detection system which is not readily activated in the presence of false stimuli.

Yet another objective of the present invention is to train a sound detection system to respond to specific acoustic signatures.

Still another objective of the present invention is to effectively characterize the sources of acoustic stimuli in order to activate appropriate responses thereto.

SUMMARY OF THE INVENTION

The foregoing and other objectives are realized by the present inventive detector comprising an automatic speech recognizer component which is trained to recognize specific non-speech sounds. Training of the automatic speech recognizer component is accomplished by providing an appropriate model to be recognized and by tuning the automatic speech recognizer to the sounds created by the desired stimulus. The automatic speech recognizer can additionally be provided with processing means for distinguishing the desired stimulus from an irrelevant or unwanted stimulus which may have acoustic signatures with a high degree of similarity to that of the desired stimulus. The invention can be implemented in a portable detector to allow detection of a specific acoustic source at any location.

BRIEF DESCRIPTION OF THE DRAWINGS

The invention will now be described in greater detail with specific reference to the appended drawings wherein.

DETAILED DESCRIPTION OF THE INVENTION

Figure 1:
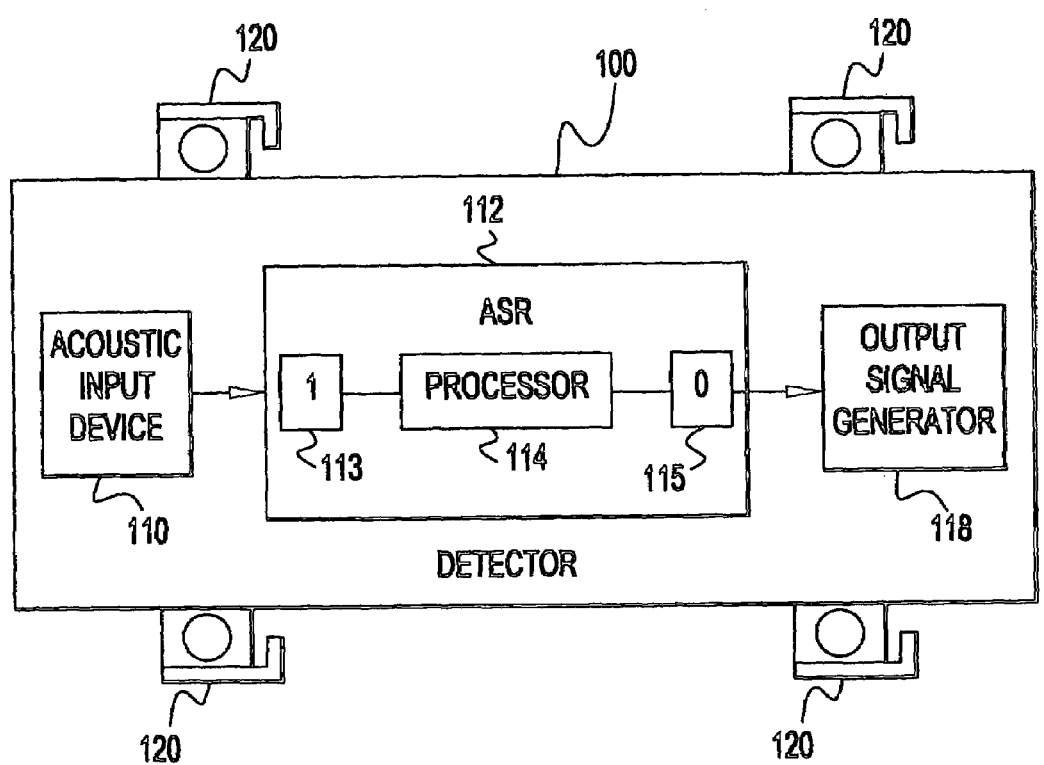
FIG. 1 is a schematic illustration of a detection system in accordance with the present invention.

The present invention makes use of an automatic speech recognizer (hereinafter, "ASR") component 112 in a detector 100 as shown in FIG. 1. For purposes of the description, a running example is introduced whereby the detector is provided to detect an approaching train, for the express purpose of alerting track workers that a train is approaching their work location. Clearly, it will be understood that the teachings are extensible to implementation in detectors for a variety of other uses. As depicted in FIG. 1, the inventive detector 100 includes an acoustic input device 110, an ASR 112, an output signal generator 118 and mounting hardware 120. The mounting hardware 120 is optional, but is shown for the example implementation wherein the detector may be mounted on a rail.

The acoustic input device, 110, receives acoustic input and provides same to the ASR 112. The acoustic input device 110 can be realized as a microphone or as any other mechanical-to-electrical transducer, such as a piezoelectric element. The acoustic input device may include an adjustable pre-amplifier circuit (not shown) for adjusting the amplitude sensitivity of the acoustic input device which permits the device to be used in a plurality of different environments. In addition to this amplitude sensitivity adjustment (i.e., for adjusting the sensitivity of the acoustic input device to a range of input volumes), frequency adjustments may be provided at the input stage 110 in the form of one or more acoustic filters (not shown), for filtering out certain ambient sounds which are expected to be encountered in the detection environment. By filtering out irrelevant ambient sounds, the acoustic input device can reduce the required processing by the ASR and can, thereby, provide a more responsive detector. It is additionally contemplated that the acoustic input device could dynamically tune the filters and the pre-amplifier gain in situ to improve the filtering out of specific unanticipated ambient sounds for a particular detection location (e.g., in a railroad tunnel).

It is particularly advantageous to utilize an acoustic input device that digitizes the acoustic input prior to providing same to the ASR. While analog signal processing can perform the signal analysis needed for the present invention, it is generally recognized that digital signal processing can result in faster and more accurate results. However, should the acoustic input device 110 not be equipped with analog-to-digital (A-D) signal conversion means, the ASR can process the analog input or can, itself, digitize the signal if appropriately equipped with its own A-D converter. It is also to be noted that the acoustic input device's gain and frequency control functionality could be incorporated into the ASR.

With specific reference to FIG. 1, the ASR 112 is coupled to the acoustic input device 110 and includes at least an input component 113 for receiving the acoustic signal from the acoustic input device, a processing component 114 for processing the input acoustic signal and for generating a signal at output 115, and output 115 for providing output to the output signal generator 118 (discussed in greater detail below). The processing component 114 of ASR 112 of the present inventive detector 100 is trained to classify sounds and/or sound sources using one or more of a plurality of features of the acoustic signal input, such as amplitude, frequency, pitch, onset and offset of sound, frequency transitions and audio segmentation. The ASR is tuned to a specific signal feature or to a plurality of specific signal features which represent the acoustic signature of the desired stimulus (i.e., in the present running example, the signature of the approaching train to be detected). The training information, including one or a plurality of acoustic signal signature features, can be stored in a storage location (not shown) accessible by the processing component.

The processing component of the ASR analyzes the acoustic input signal in accordance with the parameters specified by its tuning. For example, the first signal analysis step may be to determine the frequency of the input signal and to compare that frequency to one or a plurality of "target" frequencies for desired stimuli. If the input signal has a frequency which is at the target frequency or in the target range of frequencies, the processing component may next look at another signal feature, such as the duration of the signal, in order to determine if the input is from the desired stimulus or is simply a signal having the same frequency as the desired stimulus. For example, a low frequency signal may be received; but, based on its amplitude and signal duration, the processing component may determine that it is from a distant truck rather than an approaching train. Clearly it is not necessary for the ASR to affirmatively identify a signal source, but rather, simply to determine that the input signal is or is not from the desired (a.k.a., target) source. Should definitive identification of the signal source be desired, however, the ASR processing component could be provided with a database (not shown) of acoustic signal signatures and sources in order to match the processed input to a database entry. An alternative signal processing progression could be to first analyze the signal amplitude followed by a frequency analysis. In that way, for example, a signal from a plane flying overhead could be distinguished from a signal generated by an approaching train. As above, it will probably not be necessary to identify the signal source, but simply to classify it as "from a target source" or "not from a target source". The details of a basic acoustic input detector and the training/tuning of such a detector can be found in the reference entitled "A Maximum Likelihood Approach to Continuous Speech Recognition", by L. R. Bahl, F. Jelnek and R. L. Mercer, IEEE Transactions on Pattern Analysis and Machine Intelligence, Vol. PAMI-5, pp. 179–190 (March 1983).

Once the ASR has identified the signal as being from a target source, the processing component 114 will generate an output at 115 which is provided to the output signal generator 118. The output signal generator 118 can be a component which itself emits the desired output signal (e.g., audible alarm) or can be a component which is coupled to another signal emitting component or components. If the output signal generator 118 is found in a stand-alone detector, it is advantageous that the output signal generator 118 itself emit the desired signal by, for example, sounding an audible alarm, switching on warning lights, or a combination of the foregoing. Alternative embodiments could have the output signal generator coupled to a display for generating a visual indicator, coupled to a modem for communicating the event detection to a control location, etc.

It is to be noted that, if the ASR is adapted to definitively identify the source of the acoustic input, it may be desirable to trigger different responses at the output signal generator, depending upon the detected source. In the example of a detector for guarding property, therefore, if the detected source is a truck approaching the gates at high speed, the detector will "pull out all stops" (e.g., lights and alarms) to warn guards; while, if the detected source is a car passing by the gates, the detector may simply activate a signal light indicating that a proximate acoustic signal source has been detected but does not present an imminent threat.

Figure 2:
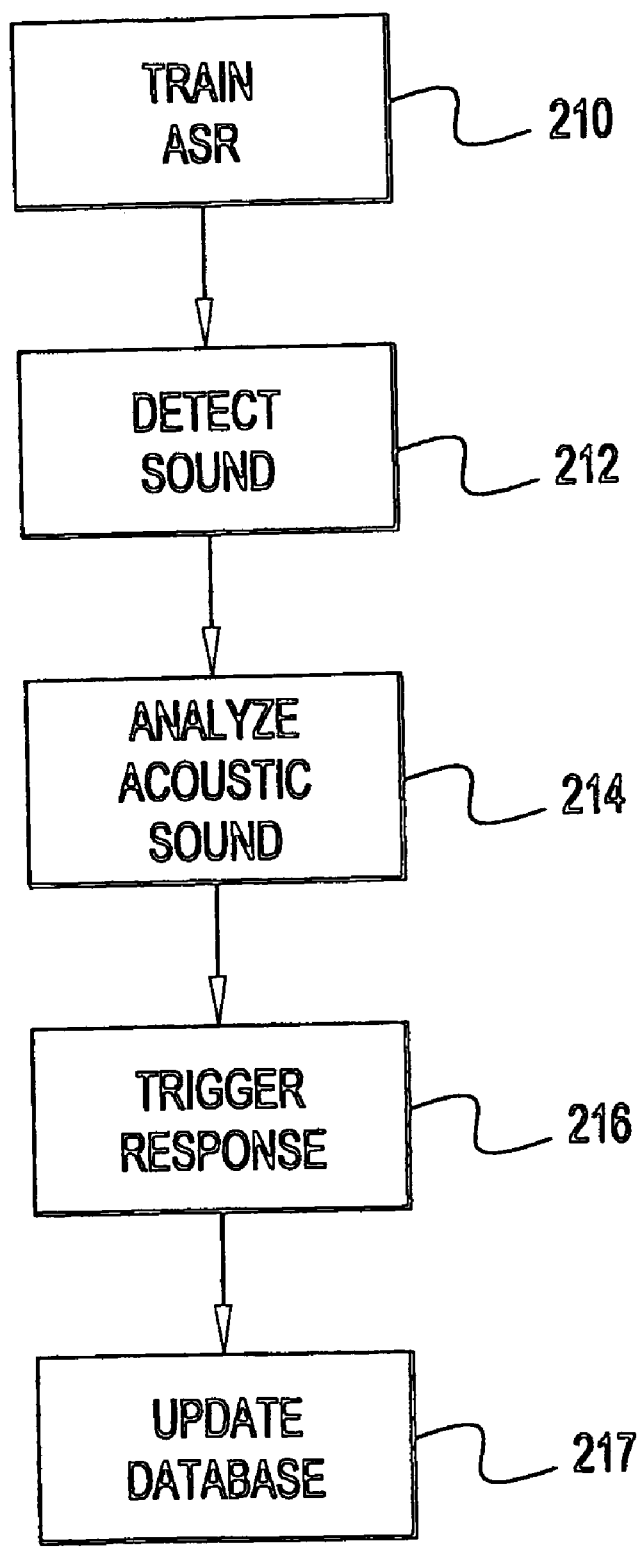
FIG. 2 provides a representative process flow for implementing the present invention.

FIG. 2 provides a representative process flow for implementation of the present invention. The process flow is for a stationary detector, but would easily be augmented to include placement or mounting of a mobile detector and dynamic filter tuning, as needed, for the specific detection environment. As shown in FIG. 2, a detector is first "trained" at 210. By training the detector, what is meant is tuning the ASR of the detector to the specific target sounds to be detected. The training of the ASR can be done prior to or after inclusion of the ASR in a detector system. In addition, the training of the ASR may be dynamically adjusted (i.e., its comparison tables updated), so that one detector can be trained innumerable times to perform detection of different stimuli, assuming that no different signal processing is required for the alternative training.

Once the ASR has been trained, the next step in the FIG. 2 process flow is detection of the sound at step 212, wherein the acoustic input device 110 picks up the input and provides it to the ASR 112. Once the ASR 112 has received the input, it performs step 214 by categorizing the sound. If the sound is one for which a response is necessary, the system then triggers the response at step 216. As noted above, the ASR of the detector may simply be adapted to determine whether the input acoustic signal is from a target source or is not from a target source; in which case, the categorizing step simply comprises a "yes" or "no" determination. If, however, the ASR has been programmed to more completely analyze the acoustic signal, the categorizing step may include consulting its database to specifically identify the source of the sound, followed by triggering a specific response thereto.

Since the inventive detector, 100 of FIG. 1, is trainable, its accuracy for detecting target stimuli and for rejecting input from non-target stimuli can be improved by allowing for and incorporating a feedback control step 217 into the system. If this feedback mechanism is present, the acoustic signature database can be dynamically updated in situ by allowing for a human operator to correct mis-categorized stimulus signals. Thus, the system will learn to distinguish the target stimulus, even when a closely related non-target stimulus is present in its environment.

Given the fact that many objects emit sounds with an amplitude such that they can be detected and classified well before they are within the usable range for current infrared or ultrasonic proximity or motion detectors, the present invention allows one to react earlier to the triggering event than was possible with prior art systems. This aspect of the invention is quite desirable in time-critical applications, such as burglar alarms. In addition, in the case of the running example, it is possible to take advantage of the increased speed of sound within a rail to identify the stimulus early enough to provide a warning to clear the tracks where necessary, and to disregard other stimuli where there is no danger, such as a car crossing the tracks. It is noteworthy that such a system can be a portable and self-contained product, and thus can be used by railroad repairmen while they are working on tracks far from a station, terminal, or gated crossing where there are typically no train detectors. For the rail-mounted detector embodiment, transducers affixed directly to the rails can provide signals from faraway trains, as sounds dissipate less along the rails than atmospherically. Additionally, signal intensity analysis can be used to estimate vehicular distance, obviating the need for a series of detectors spaced at various distances from the work area.

While the invention has been described with reference to several preferred embodiments, it will be understood by one having skill in the relevant art that modifications can be made without departing from the spirit and scope of the invention as set forth in the appended claims.

What is claimed is:

1. A system for detecting the presence of a source of audible input comprising:
   at least one acoustic input device for receiving acoustic input and for providing an input acoustic signal based thereon;
   an automatic speech recognition component for analyzing a plurality of features of the input acoustic signal, for categorizing said input acoustic signal as from a target source based on said features, and for characterizing the proximity of said target source of said input acoustic signal from said features; and
   at least one response signal component for generating a response based on said categorizing wherein said response comprises at least one of multiple different responses triggered based on said characterizing.

2. The system of claim 1 further comprising at least one mounting component for mounting the system at a detection location.

3. The system of claim 1 wherein the automatic speech recognition component comprises at least one database for storing information matching at least one acoustic signal feature to at least one particular source and wherein said categorizing comprises comparing at least one feature of the input acoustic signal to said information in the at least one database.

4. The system of claim 1 wherein the at least one response signal component comprises a component for generating an audible alarm.

5. The system of claim 1 wherein the at least one response signal component comprises a modem for communicating with a remote location based on said categorizing.

6. The system of claim 1 further comprising at least one filter for eliminating unwanted signal components from the input acoustic signal.

7. A method for detecting the presence of a source of acoustic input comprising the steps of:
   receiving acoustic input;
   providing an input acoustic signal based on said acoustic input;
   analyzing a plurality of features of the input acoustic signal;
   categorizing said input acoustic signal as from a target source based on said analyzing and characterizing the proximity of said target source of the input acoustic signal based on said analyzing of said plurality of signal features; and
   generating a response based on said categorizing wherein said response comprises at least one of multiple different responses triggered based on said characterizing.

8. The method of claim 7 wherein at least said analyzing and categorizing are performed by an automatic speech recognition system and further comprising training the automatic speech recognition system.

9. The method of claim 8 wherein the automatic speech recognition system is portable and further comprising dynamically adjusting the training of said automatic speech recognition system in situ.

10. The method of claim 8 wherein said training comprises creating at least one database comprising information matching at least one acoustic signal feature to at least one particular source.

11. The method of claim 10 wherein said training further comprises refining the database after said categorizing.

12. The method of claim 9 wherein said categorizing the input acoustic signal based on said analyzing comprises comparing the features of the input acoustic signals with the information in said database to identify a particular source of said input acoustic signal.

13. The method of claim 12 wherein said generating a response based on said categorizing comprises triggering one of a plurality of responses bases on the identification of a particular source.

14. The method of claim 7 wherein said analyzing features of the input acoustic signal comprises analyzing at least one of amplitude, frequency, pitch, onset and offset of sound, frequency transitions, and audio segmentation.

15. The method of claim 7 wherein said generating a response based on said categorizing comprises triggering an alarm.

16. The method of claim 7 wherein said generating a response based on said categorizing comprises communicating over a modem with a remote location.

17. The method of claim 7 further comprising filtering the input acoustic signal to eliminate unwanted signal components.

18. A program storage device readable by machine, tangibly embodying a program of instructions executable by the machine to perform method steps for detecting the presence of a source of acoustic input, said method comprising the steps of:
   receiving acoustic input;
   providing an input acoustic signal based on said acoustic input;
   analyzing a plurality of signal features of the input acoustic signal;
   categorizing the source and characterizing the proximity of the input acoustic signal based on said analyzing of said plurality of signal features; and
   generating a response based on said categorizing wherein said response comprises at least one of multiple different responses triggered based on said characterizing.

* * * * *